(12) United States Patent
Han et al.

(10) Patent No.: US 11,153,502 B2
(45) Date of Patent: Oct. 19, 2021

(54) METHOD AND APPARATUS FOR ADJUSTING EXPOSURE TIME OF CAMERA AND DEVICE

(71) Applicant: GOERTEK INC., Shandong (CN)

(72) Inventors: Xinxin Han, Weifang (CN); Zhiyong Zhao, Weifang (CN); Nanjing Dong, Weifang (CN); Debo Sun, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 16/976,745

(22) PCT Filed: Apr. 9, 2019

(86) PCT No.: PCT/CN2019/081889
§ 371 (c)(1),
(2) Date: Aug. 29, 2020

(87) PCT Pub. No.: WO2019/228071
PCT Pub. Date: Dec. 5, 2019

(65) Prior Publication Data
US 2021/0075950 A1 Mar. 11, 2021

(30) Foreign Application Priority Data

May 31, 2018 (CN) .......................... 201810553659.8

(51) Int. Cl.
*H04N 5/235* (2006.01)
*H04N 9/04* (2006.01)

(52) U.S. Cl.
CPC ......... *H04N 5/2353* (2013.01); *H04N 5/2351* (2013.01); *H04N 9/04* (2013.01)

(58) Field of Classification Search
CPC ...... H04N 5/2353; H04N 5/2351; H04N 9/04; H04N 5/2354; H04N 5/202
See application file for complete search history.

(56) References Cited

U.S. PATENT DOCUMENTS 4,541,106 A * 9/1985 Belanger .................. H05G 1/44
378/118
7,538,817 B2 5/2009 Ogawa
(Continued)

FOREIGN PATENT DOCUMENTS

CM 108777769 A 11/2018
CN 101399919 A 4/2009
(Continued)

OTHER PUBLICATIONS

Chinese Office Action dated Apr. 17, 2019 as received in application No. 201810553659.8.
(Continued)

*Primary Examiner* — Hung H Lam
(74) *Attorney, Agent, or Firm* — Maschoff Brennan

(57) ABSTRACT

Provided are a method and an apparatus for adjusting an exposure time of a camera and a device, where the method includes: controlling the camera to collect an imaging light spot of an imaging component with a first exposure time; obtaining an energy value received when the camera collecting the imaging light spot; if the energy value is not within a set energy range, obtaining a curve parameter corresponding to an exposure time-energy curve according to the energy value and the first exposure time; calculating an estimated exposure time corresponding to an optimal energy value according to the curve parameter; and updating the first exposure time with the estimated exposure time corresponding to the optimal energy value. The technical solution provided in the present disclosure can adjust the exposure time of the camera to a reasonable value so as to improve the accuracy and reliability of light spot analysis.

16 Claims, 4 Drawing Sheets

(56) References Cited

U.S. PATENT DOCUMENTS

| | | | |
|---|---|---|---|
| 2004/0185368 A1* | 9/2004 | Dammel | G03F 7/0226 430/191 |
| 2005/0057546 A1* | 3/2005 | Shibutani | H04N 5/232411 345/204 |
| 2005/0190287 A1 | 9/2005 | Ogawa | |
| 2007/0153098 A1* | 7/2007 | Kao | H04N 5/202 348/234 |
| 2019/0124748 A1* | 4/2019 | Dielacher | H05B 45/12 |

FOREIGN PATENT DOCUMENTS

| | | |
|---|---|---|
| CN | 101399919 B | 5/2010 |
| CN | 106657802 A | 5/2017 |
| CN | 106982333 A | 7/2017 |
| CN | 107948542 A | 4/2018 |

OTHER PUBLICATIONS

Chinese Office Action dated Sep. 12, 2019 as received in application No. 201810553659.8.

* cited by examiner

METHOD AND APPARATUS FOR ADJUSTING EXPOSURE TIME OF CAMERA AND DEVICE

TECHNICAL FIELD

The present disclosure relates to the field of assembling technology, and in particular a method and an apparatus for adjusting an exposure time of a camera and a device.

BACKGROUND

Nowadays, there are more and more optical modules with independent functions in the market to meet diversified market demands. These optical modules can be embedded in other devices to perform their functions, such as camera modules, miniature projection modules, LED (short for Light Emitting Diode) optical modules, VR (short for Virtual Reality)/AR (short for Augmented Reality) optical modules and so on.

Generally, an optical module is assembled by a plurality of optical elements and other components. For example, the camera module can be assembled by components such as an image sensor, a lens base, a plurality of lenses, and a circuit board. Specifically, the assembly accuracy of the lens plays a decisive role in the optical performance of the optical module. In an optical module assembly method, the optical module images during the assembly process, the camera is used to collect the imaging light spot, and whether the lens to be assembled is aligned is determined according to the size of the imaging light spot. The alignment of the lens to be assembled is continuously adjusted if the lens is not aligned.

In the process of collecting the imaging light spot by the camera, in order to ensure a collecting quality of the imaging light spot, the exposure time of the camera needs to be controlled within a reasonable range. Therefore, how to control the exposure time of the camera within a target range is a technical problem to be solved urgently.

SUMMARY

Various aspects of the present disclosure provide a method and an apparatus for adjusting an exposure time of a camera and a device, which are used to adjust the exposure time of the camera to a reasonable value, which is conducive to shooting a clear imaging light spot, so as to improve the accuracy and reliability of light spot analysis.

The present disclosure provides a method for adjusting an exposure time of a camera, including: controlling the camera to collect an imaging light spot of an imaging component with a first exposure time; obtaining an energy value received when the camera collecting the imaging light spot; if the energy value is not within a set energy range, obtaining a curve parameter corresponding to an exposure time-energy curve according to the energy value and the first exposure time; calculating an estimated exposure time corresponding to an optimal energy value according to the curve parameter; and updating the first exposure time with the estimated exposure time corresponding to the optimal energy value.

Further optionally, if the energy value is within the set energy range, the method further includes: using the first exposure time as an optimal exposure time of the camera collecting the imaging light spot.

Further optionally, the obtaining the curve parameter corresponding to the exposure time-energy curve according to the energy value and the first exposure time, includes: determining a slope and a intercept of the exposure time-energy curve according to the energy value $e_n$ and the first exposure time $t_n$, an energy value $e_{n-1}$ received when the camera collecting the imaging light spot last time, and a corresponding exposure time $t_{n-1}$.

Further optionally, after the updating the first exposure time with the estimated exposure time corresponding to the optimal energy value, the method further includes: controlling an imaging brightness of the imaging component to remain unchanged, so that the camera collects the imaging light spot of the imaging component with the same brightness with an updated first exposure time.

Further optionally, when a color depth of the camera is 14 bits, the energy range of the camera is 10000±500.

The present disclosure further provides an apparatus for adjusting an exposure time of a camera, including:

a collecting module, configured to control the camera to collect an imaging light spot of an imaging component with a first exposure time;

an energy obtaining module, configured to obtain an energy value received when the camera collecting the imaging light spot;

a curve parameter determining module, configured to obtain a curve parameter corresponding to an exposure time-energy curve according to the energy value and the first exposure time if the energy value is not within a set energy range;

an estimating module, configured to calculate an estimated exposure time corresponding to an optimal energy value according to the curve parameter; and an exposure time updating module, configured to update the first exposure time with the estimated exposure time corresponding to the optimal energy value.

Further optionally, the apparatus further includes an exposure time determining module, specifically configured to: use the first exposure time as an optimal exposure time of the camera collecting the imaging light spot, if the energy value is within the set energy range.

Further optionally, the curve parameter determining module is specifically configured to: determine a slope and a intercept of the exposure time-energy curve according to the energy value $e_n$ and the first exposure time $t_n$, an energy value $e_{n-1}$ received when the camera collecting the imaging light spot last time, and a corresponding exposure time $t_{n-1}$.

Further optionally, the collecting module is further configured to: control an imaging brightness of the imaging component to remain unchanged, so that the camera collects the imaging light spot of the imaging component with the same brightness with an updated first exposure time.

The present disclosure further provides an electronic device, including: a memory and a processor; where the memory is used to store at least one computer instruction; and the processor is coupled with the memory for executing the method for adjusting the exposure time of the camera provided by the present disclosure.

In the present disclosure, after the imaging component images, the camera can be used to obtain the imaging light spot to analyze the imaging characteristics of the imaging component. In the above process, it is judged whether the energy value received when the camera collecting the imaging light spot is within the set energy range or not, and the exposure time is adjusted based on the judgment result. The present embodiment is conducive to adjusting the exposure time of the camera to the reasonable value, which is conducive to shooting a clear imaging light spot, so as to improve the accuracy and reliability of light spot analysis.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

In an existing optical module alignment assembly method, a light source is used to illuminate the optical module to be aligned to make it image, and then a camera is used to obtain the imaging light spot of the optical module to be aligned. After that, based on the position and size of the collected imaging light spot, it is analyzed whether the lens to be assembled and the optical element to be assembled in the optical module to be aligned are aligned.

The exposure time is an important parameter of camera imaging. Generally, the longer the exposure time is, the more photons the photosensitive material of the camera receives, the brighter the shot image is, and vice versa. In the optical module alignment assembly method based on spot analysis, when the camera is used to collect the imaging light spot, if the exposure time of the camera is too short, the collected imaging light spot will be relative dark, which is not conducive to capturing the characteristics of the imaging light spot; and if the exposure time is too long, the collected imaging light spot will be relative brighter, causing the shot light spot to be abnormal. For example, some pixels at the edge of the light spot will be lost due to overexposure, which is also not conducive to capturing the characteristics of the imaging light spot.

Therefore, in the optical module alignment assembly method based on the spot analysis, in order to improve the reliability and accuracy of the spot analysis, the brightness and clarity of the light spot need to be kept within a reasonable range, and the exposure time of the camera needs to be controlled thereby.

Figure 1:
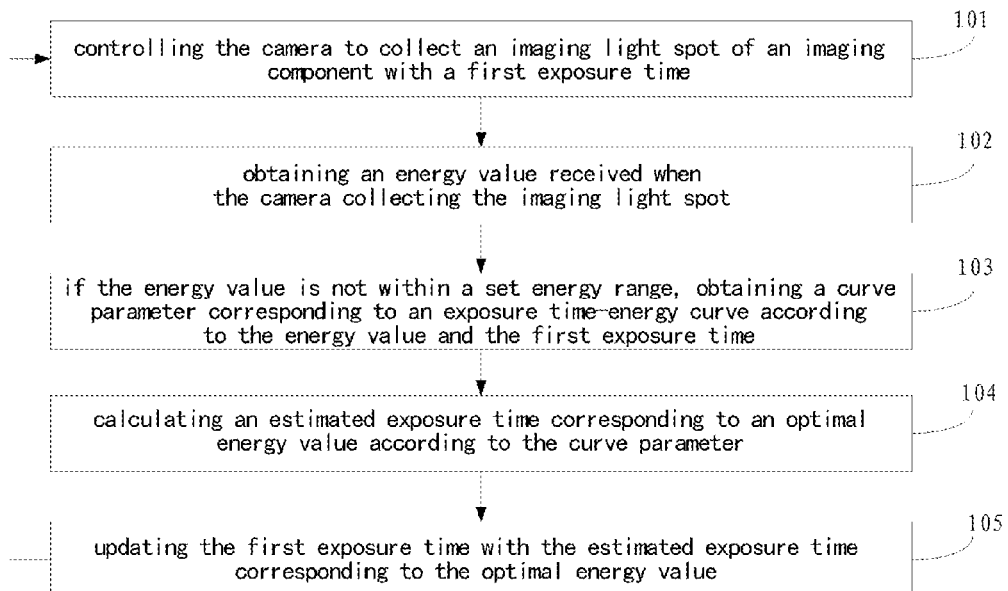
FIG. 1 is a flowchart of a method for adjusting an exposure time of a camera according to an embodiment of the present disclosure.

In view of this, an embodiment of the present disclosure provides a method for adjusting an exposure time of a camera. As shown in FIG. 1, the method includes:

step 101: controlling the camera to collect an imaging light spot of an imaging component with a first exposure time;

step 102: obtaining an energy value received when the camera collecting the imaging light spot;

step 103: if the energy value is not within a set energy range, obtaining a curve parameter corresponding to an exposure time-energy curve according to the energy value and the first exposure time;

step 104: calculating an estimated exposure time corresponding to an optimal energy value according to the curve parameter; and step 105: updating the first exposure time with the estimated exposure time corresponding to the optimal energy value.

When the camera shoots one certain object, the incident light falls on the pixel array of the photosensitive element in the camera in the form of photons. The energy of each photon is absorbed by the photosensitive element and reacts to generate one electron. The energy value received by the camera when collecting the imaging light spot in the present embodiment refers to the light energy value absorbed by the photosensitive element in the camera when the photosensitive element in the camera shoots the imaging light spot. The light energy value is related to the imaging brightness of the imaging component and the exposure time of the camera. Therefore, in the present embodiment, under the condition that the imaging brightness of the imaging component remains unchanged, the energy value received when the camera collecting the imaging light spot can be used as a reference to adjust the exposure time of the camera.

Specifically, the first exposure time refers to the time from opening to closing the shutter of the camera. The exposure time determines the quality of the imaging light spot shot by the camera. When the first exposure time is within a reasonable range, the camera can shoot an imaging light spot with better quality, which is conducive to conducting the analyzing and calculating of the size and the barycentric coordinates of the light spot. When the above-mentioned camera shoots a better quality imaging light spot, the range corresponding to the light energy value received by the photosensitive element in the camera can be used as the set energy range to determine whether the exposure time of the camera is reasonable.

If the energy received when the camera collecting the imaging light spot is not within the set energy range, it means that the first exposure time is unreasonable, and the first exposure time need to be updated at this time. In the present embodiment, the estimated exposure time corresponding to the optimal energy value can be determined based on the exposure time-energy curve, and the first exposure time can be updated with the estimated exposure time.

Based on the updated first exposure time, the camera continues to collect the imaging light spot. Then, it is determined whether to continue adjusting the duration of the first exposure time according to the energy received when the camera collecting the imaging light spot. That is to say, the process of adjusting the first exposure time of the camera in the present embodiment is a cyclically executed process, and the specific cyclic process is described in steps 101 to 105. When the energy value received by the camera when collecting the imaging light spot is within the set energy range, the cycle ends.

In the present embodiment, after the imaging component images, a camera can be used to obtain the imaging light spot to analyze the imaging characteristics of the imaging component. In the above process, it is judged whether the energy value received when the camera collecting the imaging light spot is within the set energy range or not, and the exposure time is adjusted based on the judgment result. The present embodiment is conducive to adjusting the exposure time of the camera to the reasonable value, which is conducive to shooting a clear imaging light spot, so as to improve the accuracy of the calculating of the size and centroid of the light spot.

The foregoing or following embodiments of the present disclosure are applicable to cameras using CCD (short for Charge-coupled Device)/CMOS (short for Complementary Metal Oxide Semiconductor) as the photosensitive element. The following part will specifically describe method for adjusting the exposure time of the camera according to the present disclosure with a specific optional embodiment in conjunction with FIG. 2a.

Figure 2A:
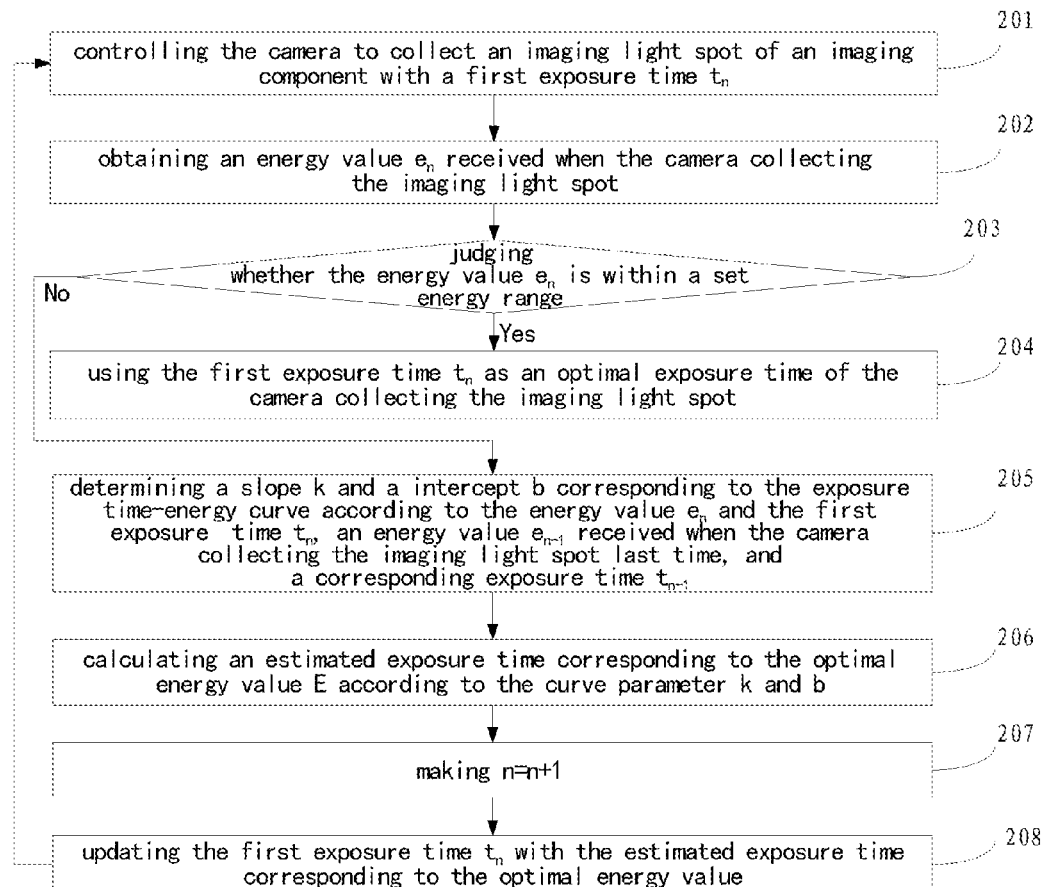
FIG. 2a is a flowchart of a method for adjusting an exposure time of a camera according to another embodiment of the present disclosure.

FIG. 2a is a flowchart of a method for adjusting an exposure time of a camera according to another embodiment of the present disclosure. As shown in FIG. 2a, the method includes:

step 201: controlling the camera to collect an imaging light spot of an imaging component with a first exposure time $t_n$;

step 202: obtaining an energy value $e_n$ received when the camera collecting the imaging light spot;

step 203: judging whether the energy value $e_n$ is within a set energy range or not, if yes, go to step 204; if no, go to step 205;

step 204: using the first exposure time $t_n$ as an optimal exposure time of the camera collecting the imaging light spot;

step 205: determining a slope k and a intercept b corresponding to the exposure time-energy curve according to the energy value $e_n$ and the first exposure time $t_n$, an energy value $e_{n-1}$ received when the camera collecting the imaging light spot last time, and a corresponding exposure time $t_{n-1}$;

step 206: calculating an estimated exposure time corresponding to the optimal energy value E according to the curve parameter k and b;

step 207: making n=n+1; and step 208: updating the first exposure time $t_n$ with the estimated exposure time corresponding to the optimal energy value, and go to step 201.

Optionally, in the light spot detection apparatus used in the optical module alignment assembly, the object light source included in the imaging component is a multi-color color light source. The multiple optical modules included in the imaging component can respectively image the color light source to obtain light spots with different colors, and then the camera can collect and analyze the imaging light spots of multiple optical modules to finally achieve simultaneous conducting the alignment assembly of the multiple optical modules.

In this application scenario, the camera used to shoot the imaging light spot needs to have a high color image collecting capability. In the present embodiment, optionally, in order to make the colored imaging light spot have a better imaging effect on the camera, a camera with a color depth of 14 bits is selected to collect the imaging light spot.

In the present embodiment, n identifies an order of collecting an imaging light spot, and n is a positive integer and n≥2.

In step 202, when the object is focused on the photosensitive element of the camera through the lens of the camera, such as a CCD/CMOS chip, the photosensitive element can accumulate a corresponding proportion of charge according to the intensity of light and the number of photons, and form an image signal to output. Therefore, in this step, the energy value $e_n$ received when the camera collecting the imaging light spot can be obtained by obtaining the intensity of the image signal output by the camera. It should be understood that the amount of energy collected by the camera can be quantified as the size of the gray value. For example, the higher the energy collected by the camera is, the brighter the corresponding image brightness is, and the higher the gray value of the corresponding pixel is. Based on this, in the foregoing or following embodiments of the present disclosure, the size of the gray value may be used to represent the amount of the energy value received when the camera collecting the imaging light spot, and the range of the gray value of the pixel can be used to represent the energy range.

In step 203, optionally, when the color depth of the camera is 14 bits, the energy range corresponding to the camera can be set being within 10000±500. When the energy value received when the camera collecting the imaging light spot is within [9500, 10500], the quality of the collected imaging light spot is higher.

In step 204, when the energy value received when the camera collecting the imaging light spot is within the energy range, for example, [9500, 10500], it can be considered that the exposure time of the camera at this time is within a reasonable range, and the exposure time can be regarded as the optimal exposure time of the camera collecting the imaging light spot. When the imaging light spot is subsequently collected, it can be collected based on the optimal exposure time to improve the quality of the imaging light spot, improve the accuracy of the calculating of the size and centroid of the light spot, and improve the alignment accuracy of the optical module.

In step 205, when the energy value received when the camera collecting the imaging light spot is not within the energy range, for example, less than 9500 or greater than 10500, it can be determined that the setting of the first exposure time is unreasonable. At this time, a more proper exposure time can be found based on the optimal energy value and the exposure time-energy curve.

In an optional embodiment, there is a linear relationship between the energy received by the camera and the exposure time, and the exposure time-energy curve can be expressed as e=k*t+b, where e represents the energy, t represents the exposure time, and k and b are constants respectively. Therefore, in this step, the slope k and the intercept b of the exposure time-energy curve can be determined by using the energy value $e_n$ received when the camera collecting the imaging light spot presently and a corresponding first exposure time $t_n$, and an energy value $e_{n-1}$ received when the camera collecting the imaging light spot last time and a corresponding exposure time $t_{n-1}$. Specifically, substituting $(t_{n-1}, e_{n-1})$ and $(t_n, e_n)$ into e=k*t+b, we can get:

$$k=(e_n-e_{n-1})/(t_n-t_{n-1})$$

$$b=e_{n-1}-t_{n-1}*(e_n-e_{n-1})/(t_n-t_{n-1})=e_n-t_n*(e_n-e_{n-1})/(t_n-t_{n-1})$$

Figure 2B:
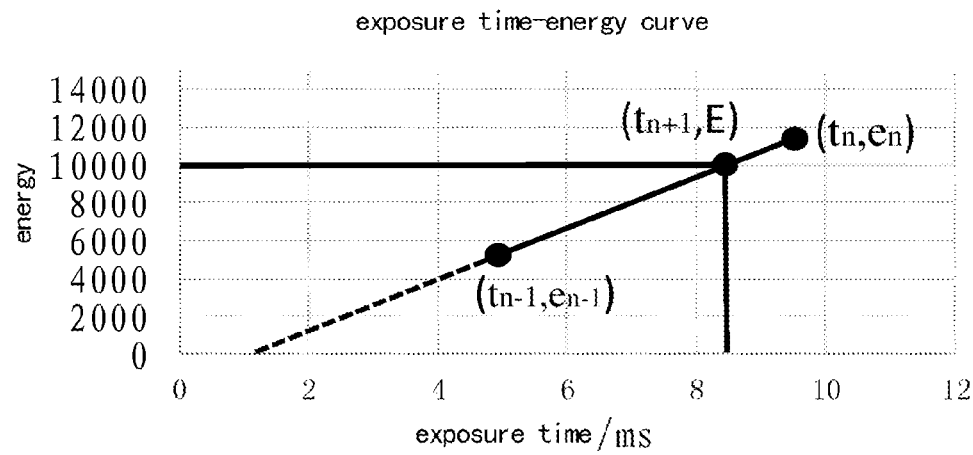
FIG. 2b is a schematic diagram of an exposure time-energy curve according to an embodiment of the present disclosure.

According to k and b, the curve determined by $(t_{n-1}, e_{n-1})$ and $(t_n, e_n)$ can be obtained, which is shown in FIG. 2b. In FIG. 2b, the horizontal axis represents the exposure time in ms, and the vertical axis represents the energy value.

In step 206, after the curve parameters k and b are determined, the estimated optimal exposure time $t_{n+1}$ corresponding to the optimal energy value E can be calculated based on the exposure time-energy curve, at this time $t_{n+1}=(E-b)/k$. As shown in FIG. 2b, the calculated $(t_{n+1}, E)$ is located on the curve determined by $(t_{n-1}, e_{n-1})$ and $(t_n, e_n)$.

It should be understood that the estimated optimal exposure time is a value obtained by guessing the optimal exposure time based on the optimal energy value and the fitted exposure time-energy curve. In fact, whether this value is the optimal exposure time of the camera, it is needed to be verified.

In steps 207 to 208, after the estimated exposure time is calculated, n=n+1 can be set, the estimated exposure time is taken as the first exposure time corresponding to the collecting the imaging light spot by the camera next time, and step 201 can be continued to continue the process of collecting the imaging light spot with the adjusted first exposure time, which will not be repeated. It should be noted that, in the present embodiment, each time the imaging light spot is collected with the updated first exposure time, the imaging brightness of the imaging component needs to be controlled to be constant to ensure the reliability of the obtained energy value.

In the present embodiment, when the camera is used to obtain the imaging light spot of the imaging component to analyze the imaging characteristics of the imaging component, the exposure time of the camera is adjusted based on the energy value received when the camera collecting the imaging light spot, which is conducive to shooting a clear imaging light spot, so as to improve the accuracy of calculating of the size and centroid of the light spot, and is conducive to ultimately improving the accuracy of the alignment assembly of the optical module.

Figure 2C:
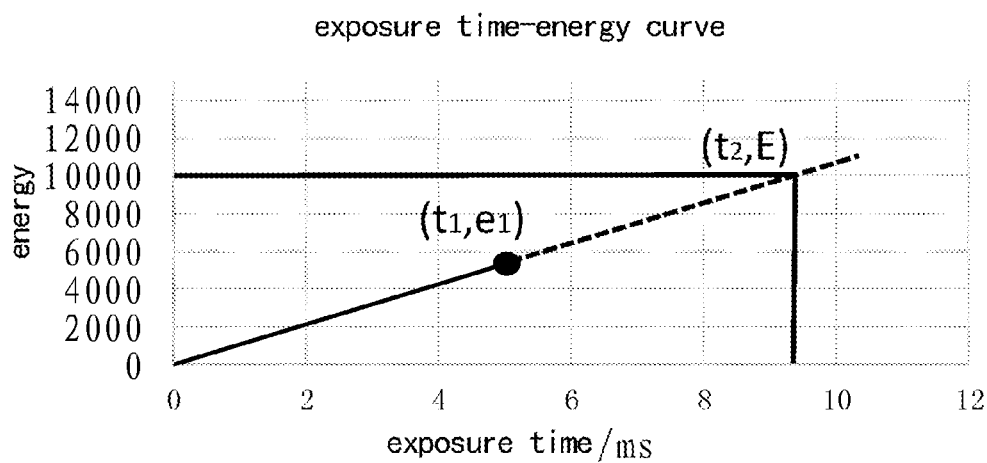
FIG. 2c is another schematic diagram of an exposure time-energy curve according to an embodiment of the present disclosure.

It should be noted that when n=1, the camera collects the imaging light spot for the first time, and an initial exposure value $t_1$ can be set for it, the energy value $e_1$ of the camera at this time is read, and whether $e_1$ is within the set energy range is determined. If $e_1$ is within the preset energy range, then $t_1$ is used as the optimal exposure time. If $e_1$ is not within the target range, the exposure time-energy curve can be assumed as e=k*t, and the value of the slope k is calculated according to $(t_1, e_1)$, $k=e_1/t_1$. Based on $e=e_1/t_1*t$, the estimated optimal exposure value $t_2$ corresponding to the optimal energy value E can be calculated. Thereby, the exposure time-energy curve shown in FIG. 2c can be fitted according to $(t_1, e_1)$ and $(t_2, E)$. In FIG. 2c, the horizontal axis represents the exposure time in ms, and the vertical axis represents the energy value. Then, when n=2, the embodiment corresponding to FIG. 2a can be executed, $t_2$ is taken as the first exposure time of the camera to collect the imaging light spot, and the energy value $e_2$ corresponding to $t_2$ is obtained. After $(t_1, e_1)$ and $(t_2, e_2)$ are obtained, the exposure time-energy curve can be assumed as e=k*t+b, and continue to perform the steps described in the embodiment corresponding to FIG. 2a, which will not be repeated here.

Besides, it should be noted that the expressions herein of "first", "second", etc. are intended to distinguish between different messages, devices, modules, etc., and are not intended to represent a sequential order, nor is it intended to limit that "first" and "second" are of different types.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Figure 3:
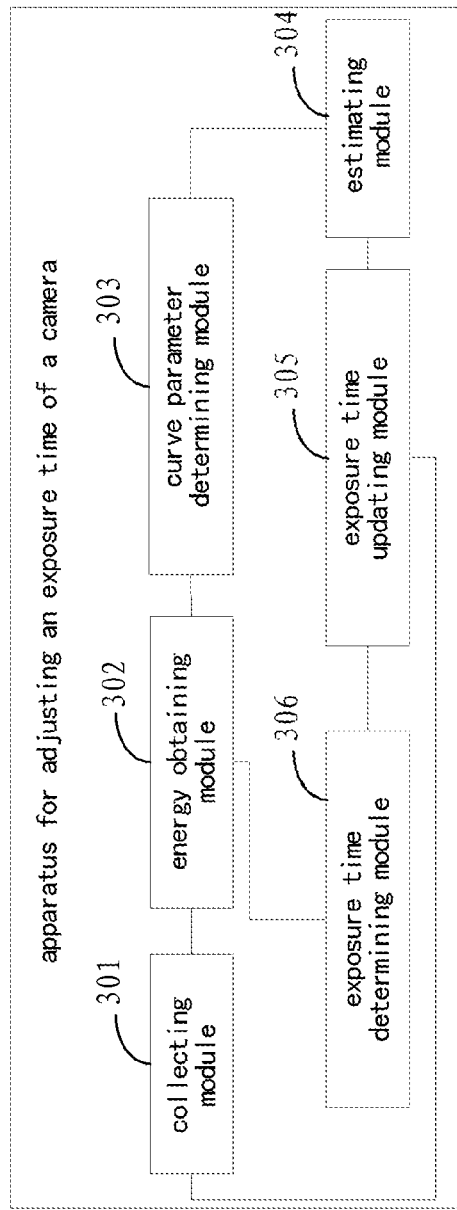
FIG. 3 is a schematic structural diagram of an apparatus for adjusting an exposure time of a camera according to an embodiment of the present disclosure.

The above describes optional implementations of the method for adjusting the exposure time of the camera. As shown in FIG. 3, in practice, the method for adjusting the exposure time of the camera can be implemented by an apparatus for adjusting the exposure time of the camera, as shown in FIG. 3, the apparatus includes:

a collecting module 301, configured to control the camera to collect an imaging light spot of an imaging component with a first exposure time;

an energy obtaining module 302, configured to obtain an energy value received when the camera collecting the imaging light spot;

a curve parameter determining module 303, configured to obtain a curve parameter corresponding to an exposure time-energy curve according to the energy value and the first exposure time if the energy value is not within a set energy range;

an estimating module 304, configured to calculate an estimated exposure time corresponding to an optimal energy value according to the curve parameter; and an exposure time updating module 305, configured to update the first exposure time with the estimated exposure time corresponding to the optimal energy value.

Further optionally, the apparatus further includes an exposure time determining module 306, configured to: use the first exposure time as an optimal exposure time of the camera collecting the imaging light spot, if the energy value is within the set energy range.

Further optionally, the curve parameter determining module 303 is specifically configured to: determine a slope and a intercept of the exposure time-energy curve according to the energy value $e_n$ and the first exposure time $t_n$, an energy value $e_{n-1}$ received when the camera collecting the imaging light spot last time, and a corresponding exposure time $t_{n-1}$.

Further optionally, the collecting module 301 is further configured to: control an imaging brightness of the imaging component to remain unchanged, so that the camera collects the imaging light spot of the imaging component with the same brightness with an updated first exposure time.

The aforementioned apparatus for adjusting the exposure time of the camera can execute the method for adjusting the exposure time of the camera according to the embodiment of the present disclosure, and has the corresponding functional modules and beneficial effects for the execution method. Technical details that are not described in detail in the present embodiment can refer to the method provided in the embodiment of the present disclosure, and will not be repeated.

Figure 4:
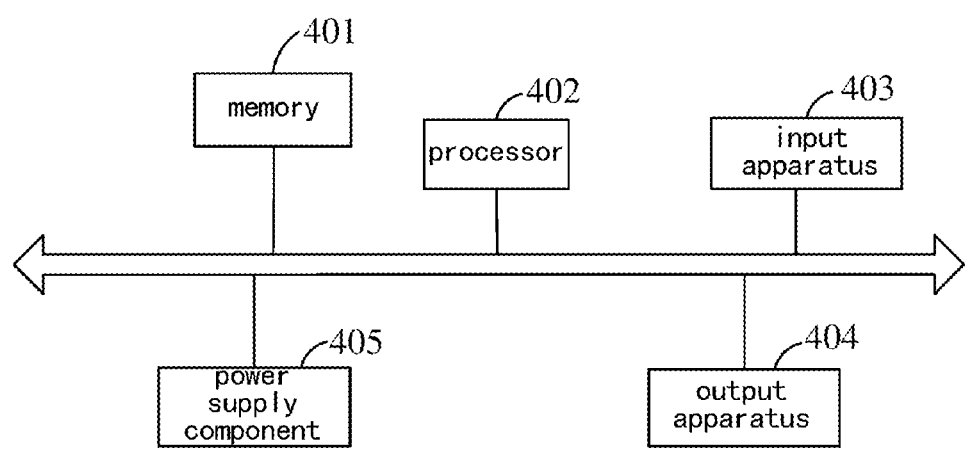
FIG. 4 is a schematic structural diagram of an electronic device according to an embodiment of the present disclosure.

The internal structure and function of the apparatus for adjusting of the exposure time of the camera are described above. In practice, the apparatus for adjusting the exposure time of the camera can be represented as an electronic device. As shown in FIG. 4, the electronic device includes a memory 401, a processor 402, an input apparatus 403, and an output apparatus 404.

The memory 401, the processor 402, the input apparatus 403, and the output apparatus 404 may be connected by a bus or other means. The bus connection is taken as an example in FIG. 4.

The memory 401 is used to store one or more computer instructions, and can be configured to store various other data to support operations on the device for adjusting the exposure time of the camera. Examples of such data include instructions of any application or method operated on the device for adjusting the exposure time of the camera.

The memory 401 can be implemented by any type of volatile or non-volatile storage device or a combination of them, such as static random access memory (SRAM for short), electrically erasable programmable read-only memory (EEPROM for short), erasable Programmable Read Only Memory (EPROM for short), Programmable Read Only Memory (PROM for short), Read Only Memory (ROM for short), Magnetic Memory, Flash Memory, Magnetic Disk or Optical Disk.

In some embodiments, the memory 401 may optionally include a memory remotely set with respect to the processor 402, and the remote memory may be connected to the device for adjusting the exposure time of the camera via a network. Examples of the aforementioned network include but are not limited to the Internet, corporate intranet, local area network, mobile communication network, and combinations thereof.

The processor 402 is coupled with the memory 401, and is configured to execute the one or more computer instructions for executing the method provided in the embodiment corresponding to FIG. 1 to FIG. 2a.

The input apparatus 403 can receive inputted number or character information, and generate key signal input related to user setting and function control of the device for adjusting the exposure time of the camera. The output apparatus 404 may include a display device such as a display screen.

Further, as shown in FIG. 4, device for adjusting the exposure time of the camera further includes: a power supply component 405. The power supply component 405 provides power for various components of the device where the power supply component is located. The power supply component may include a power management system, one or more power supplies, and other components associated with generating, managing, and distributing power for the device where the power supply component is located.

The aforementioned device for adjusting the exposure time of the camera can execute the method for adjusting the exposure time of the camera provided by the embodiments of the present application, and has the corresponding functional modules and beneficial effects for the execution method. Technical details that are not described in detail in the present embodiment can refer to the method provided in the embodiment of the present disclosure, and will not be repeated.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A method for adjusting an exposure time of a camera comprising:
    controlling the camera to collect an imaging light spot of an imaging component with a first exposure time;
    obtaining an energy value received when the camera collecting the imaging light spot;
    if the energy value is not within a set energy range, obtaining a curve parameter corresponding to an exposure time-energy curve according to the energy value and the first exposure time;
    calculating an estimated exposure time corresponding to an optimal energy value according to the curve parameter; and
    updating the first exposure time with the estimated exposure time corresponding to the optimal energy value.

2. The method according to claim 1, wherein if the energy value is within the set energy range, further comprising:
    using the first exposure time as an optimal exposure time of the camera collecting the imaging light spot.

3. The method according to claim 2, after the updating the first exposure time with the estimated exposure time corresponding to the optimal energy value, the method further comprises:
    controlling an imaging brightness of the imaging component to remain unchanged, so that the camera collects the imaging light spot of the imaging component with the same brightness with an updated first exposure time.

4. The method according to claim 2, wherein when a color depth of the camera is 14 bits, the energy range of the camera is 10000±500.

5. The method according to claim 1, wherein the obtaining the curve parameter corresponding to the exposure time-energy curve according to the energy value and the first exposure time, comprises:
    determining a slope and a intercept of the exposure time-energy curve according to the energy value $e_n$ and the first exposure time $t_n$, an energy value $e_{n-1}$ received when the camera collecting the imaging light spot last time, and a corresponding exposure time $t_{n-1}$.

6. The method according to claim 5, after the updating the first exposure time with the estimated exposure time corresponding to the optimal energy value, the method further comprises:
    controlling an imaging brightness of the imaging component to remain unchanged, so that the camera collects the imaging light spot of the imaging component with the same brightness with an updated first exposure time.

7. The method according to claim 5, wherein when a color depth of the camera is 14 bits, the energy range of the camera is 10000±500.

8. The method according to claim 1, after the updating the first exposure time with the estimated exposure time corresponding to the optimal energy value, the method further comprises:
    controlling an imaging brightness of the imaging component to remain unchanged, so that the camera collects the imaging light spot of the imaging component with the same brightness with an updated first exposure time.

9. The method according to claim 1, wherein when a color depth of the camera is 14 bits, the energy range of the camera is 10000±500.

10. An electronic device, comprising: a memory and a processor;
    wherein the memory is used to store at least one computer instruction;
    the processor is coupled with the memory for executing the method according to claim 1.

11. An apparatus for adjusting an exposure time of a camera, comprising:

a collecting module, configured to control the camera to collect an imaging light spot of an imaging component with a first exposure time;

an energy obtaining module, configured to obtain an energy value received when the camera collecting the imaging light spot;

a curve parameter determining module, configured to obtain a curve parameter corresponding to an exposure time-energy curve according to the energy value and the first exposure time if the energy value is not within a set energy range;

an estimating module, configured to calculate an estimated exposure time corresponding to an optimal energy value according to the curve parameter; and an exposure time updating module, configured to update the first exposure time with the estimated exposure time corresponding to the optimal energy value.

12. The apparatus according to claim 11, wherein the apparatus further comprises an exposure time determining module, specifically configured to:

use the first exposure time as an optimal exposure time of the camera collecting the imaging light spot, if the energy value is within the set energy range.

13. The apparatus according to claim 12, wherein the collecting module is further configured to:

control an imaging brightness of the imaging component to remain unchanged, so that the camera collects the imaging light spot of the imaging component with the same brightness with an updated first exposure time.

14. The apparatus according to claim 11, wherein the curve parameter determining module is specifically configured to:

determine a slope and a intercept of the exposure time-energy curve according to the energy value $e_n$ and the first exposure time $t_n$, an energy value $e_{n-1}$ received when the camera collecting the imaging light spot last time, and a corresponding exposure time $t_{n-1}$.

15. The apparatus according to claim 14, wherein the collecting module is further configured to:

control an imaging brightness of the imaging component to remain unchanged, so that the camera collects the imaging light spot of the imaging component with the same brightness with an updated first exposure time.

16. The apparatus according to claim 11, wherein the collecting module is further configured to:

control an imaging brightness of the imaging component to remain unchanged, so that the camera collects the imaging light spot of the imaging component with the same brightness with an updated first exposure time.

* * * * *